US005876069A

United States Patent [19]

Kobayashi

[11] Patent Number: 5,876,069

[45] Date of Patent: Mar. 2, 1999

[54] CONNECTION CONSTRUCTION FOR TUBULAR MEMBERS

[75] Inventor: Masaaki Kobayashi, Yokkaichi, Japan

[73] Assignee: Sumitomo Wiring Systems, Ltd., Japan

[21] Appl. No.: 834,573

[22] Filed: Apr. 7, 1997

[30] Foreign Application Priority Data

Apr. 5, 1996 [JP] Japan .................................... 8-084244

[51] Int. Cl.[6] ...................................................... F16L 35/00

[52] U.S. Cl. .............................. 285/24; 285/93; 285/226; 285/322; 285/903

[58] Field of Search .................................... 285/235, 236, 285/24, 27, 383, 903, 415, 226, 322, 93

[56] References Cited

U.S. PATENT DOCUMENTS

| | | | |
|---|---|---|---|
| 18,116 | 9/1857 | Wright | 285/383 X |
| 1,057,763 | 4/1913 | Mueller et al. | 285/415 |
| 3,873,137 | 3/1975 | Yamaguchi | 285/226 X |
| 4,810,008 | 3/1989 | Brodie | 285/226 X |
| 4,907,830 | 3/1990 | Sasa et al. | 285/903 X |
| 4,913,473 | 4/1990 | Bonnema et al. | 285/903 X |

FOREIGN PATENT DOCUMENTS

| | | | |
|---|---|---|---|
| 881982 | 9/1971 | Canada | 285/236 |
| 2653202 | 4/1991 | France | 285/903 |
| 1-103283 | 7/1989 | Japan . | |

*Primary Examiner*—Dave W. Arola
*Attorney, Agent, or Firm*—Anthony J. Casella; Gerald E. Hespos; Ludomir A. Budzyn

[57] ABSTRACT

To restrict a fitting length of an inserting side tubular member such as a corrugate tube into a receiving side tubular member having a flexible portion such as a rubber boot when the inserting and receiving side tubular members are connected. Projections 16 are formed on the inner surface of a fitting end portion 13. When a corrugate tube 20 is fitted into the fitting end portion 13, a leading end 20A thereof comes into contact with the projections 16, thereby restricting any further insertion of the corrugate tube 20. This prevents the entry of the corrugate tube 20 into the flexible portion 12. Accordingly, there is no likelihood that the smooth deformation of the flexible portion 12 is hindered by the entry of the corrugate tube 20 into the flexible portion 12. Further, since there is no need for a consideration as to an excessive insertion of the corrugate tube 20, the connection can easily be performed.

6 Claims, 3 Drawing Sheets

CONNECTION CONSTRUCTION FOR TUBULAR MEMBERS

BACKGROUND OF THE INVENTION

1. Field of the Invention.

The present invention relates to a connection construction for tubular members for connecting an inserting side tubular member with a receiving side tubular member having a deformable flexible portion by fitting or inserting the inserting side tubular member into the receiving side tubular member.

2. Description of the Prior Art.

Wires extending from a connector in a prior art wiring harness often are protected in a corrugate tube. The corrugate tube typically is made of resin or some other material that is relatively difficult to deform. Thus the configuration of the wires can be maintained substantially in a desired state. However, the wires spread in the vicinity of the connector, and therefore the corrugate tube having a specified fixed diameter cannot protect the wires in this spread portion of the wire bundle.

In view of the above, the prior art includes a rubber boot 3 mounted between the connector 1 and the corrugate tube 2 as shown in FIG. 6. The prior art rubber boot 3 includes a connector connection portion 7 whose width increases toward its open end, a bellows-like flexible portion 4, and a fitting end portion 5 with a longitudinally extending slit 6. The wires W extending from the connector 1 are protected by the connector connection portion 7, and the leading end of the corrugate tube 2 is fitted into the fitting end portion 5. A tape T then is wound around the fitting end portion 5. The tape T causes the slit 6 to narrow and urges the fitting end portion 5 against the outer surface of the corrugate tube 2. In this way, the rubber boot 3 and the corrugate tube 2 are connected.

The leading end of the corrugate tube 2 is fitted into the fitting end portion 5 during the connection of the rubber boot 3 and the corrugate tube 2. However, the leading end of the corrugate tube 2 is concealed by the fitting end portion 5 of the rubber boot 3 and the amount of insertion cannot be confirmed visually. Thus the leading end of the corrugate tube 2 may pass beyond the fitting end portion 5 and may enter the flexible portion 4 as shown in FIG. 7.

If the rubber boot 3 and the corrugate tube 2 are connected in this state, a smooth deformation of the flexible portion 4 may be hindered by the difficulty of the corrugate tube 2 to be deformed. Such a deformation often is necessary to arrange and align the wiring harness while bending the wires W at the flexible portion 4.

The present invention was developed in view of the above problem and an object thereof is to provided a connection construction, which ensures a smooth deformation of a deformable portion of the connection construction.

SUMMARY OF THE INVENTION

According to the invention there is provided a connection construction for connecting an inserting side tubular member with a receiving side tubular member. The receiving side tubular member has a substantially deformable flexible portion and a fitting or connecting end portion continuous or integral or unitary with the flexible portion. The connecting of these members is achieved by fitting the inserting side tubular member into the fitting end portion of the receiving side tubular member. The fitting end portion of the receiving side tubular member comprises stopper means for restricting the insertion or fitting of the inserting side tubular member into the receiving side tubular member to a predetermined or predeterminable insertion length. Thus a fitting length of an inserting side tubular member such as a corrugate tube into a receiving side tubular member having a flexible portion such as a rubber boot is restricted.

According to a preferred embodiment of the invention, there is provided a connection construction for connecting an inserting side tubular member with a receiving side tubular member having a deformable flexible portion and a fitting end portion continuous with the flexible portion by fitting the inserting side tubular member into the fitting end portion, comprising stopper means for preventing the entry of the inserting side tubular member into the flexible portion beyond the fitting end portion.

Accordingly, when the inserting side tubular member fitted into the fitting end portion reaches a specified position before the flexible portion, any further insertion of the inserting side tubular member is restricted by the stopper means, thereby preventing the entry of the inserting side tubular member into the flexible portion.

Thus, there is no likelihood that the deformation of the flexible portion of the receiving side tubular member is hindered by the entry of the inserting side tubular member into the flexible portion. Thus, the smooth deformation of the flexible portion can be ensured. Further, since there is no need to consider the fitting length of both tubular members, operability in connecting these tubular members can be improved.

Preferably, the stopper means preferably prevents the entry of the inserting side tubular member into the flexible portion beyond the fitting end portion. The stopper means preferably comprises at least one projection so as to project from the inner surface of the fitting end portion and with which the inserting side tubular member comes or can come into contact. The at least one projection may be formed integrally or unitarily with the fitting end portion.

Accordingly, when the leading edge of the inserting side tubular member fitted into the fitting end portion comes into contact with the projections, any further insertion of the inserting side tubular member is restricted, thereby preventing the entry of the inserting side tubular member into the flexible portion. Since the stopper means is constructed by the projections integrally or unitarily formed with the inner surface of the fitting end portion, the receiving side tubular member can be produced with better efficiency and at a reduced cost as compared to the case where the stopper means is a member separate from the receiving side tubular member.

Further preferably, the projections are provided in a plurality of circumferentially spaced positions, being preferably equally circumferentially spaced. Accordingly, an insertion member, such as a wire or terminal, can be inserted into the receiving side tubular member without being caught by the projections. Accordingly, unlike the case where the projection extends over the entire circumference, the insertion of the insertion member is unlikely to be hindered by the insertion member getting caught by the projections. Thus, the insertion member can easily and efficiently be inserted.

Most preferably, each projection is formed with a tapered or slanted guide surface which is smoothly continuous with the inner surface of the fitting end portion. Accordingly, even if the insertion member being inserted into the receiving side tubular member moves toward the projections, it can pass the projections without being caught by the presence of the guide surfaces. Thus, the insertion member can be inserted more easily and efficiently.

According to a further preferred embodiment of the invention, the stopper means is formed such that it comes into contact with the receiving side tubular member, in particular with a jaw portion or the edge of the receiving side tubular member.

Preferably, the stopper means comprises a ring member which projects from the outer surface of the inserting side tubular member.

Accordingly, when the ring member comes into contact with the edge of the fitting end portion as the inserting side tubular member is inserted into the fitting end portion, any further insertion of the inserting side tubular member is restricted, thereby preventing the entry of the inserting side tubular member into the flexible portion. Since the stopper means is the ring member on the outer surface of the inserting side tubular member, the contact of the ring member with the fitting end portion can be visually confirmed. Accordingly, an insufficient connection resulting from an excessively short fitting length of the inserting side tubular member into the receiving side tubular member can be prevented.

Preferably, the receiving side tubular member is provided with one or more slits, being in particular equally circumferentially spaced, preferably for securing the inserting side tubular member to the receiving side tubular member by reducing at least partially the circumference of the receiving side tubular member.

Further preferably, the circumference of the receiving side tubular member is reduced by applying fastening means, in particular by winding tape or fitting or inserting a clamp, to the receiving side tubular member.

BRIEF DESCRIPTION OF THE DRAWINGS

These and other objects, features and advantages of the present invention will become more apparent upon a reading of the following detailed description and accompanying drawings in which.

DETAILED DESCRIPTION OF THE PRIOR ART

Figure 1:
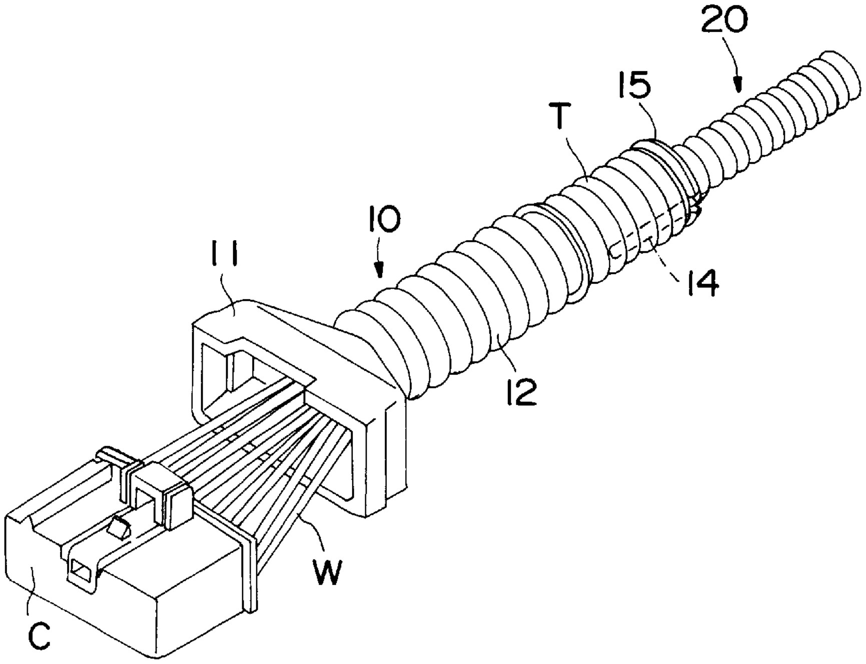
FIG. 1 is a perspective view of a rubber boot and a corrugate tubed according to a first embodiment of the invention.
Figure 2:
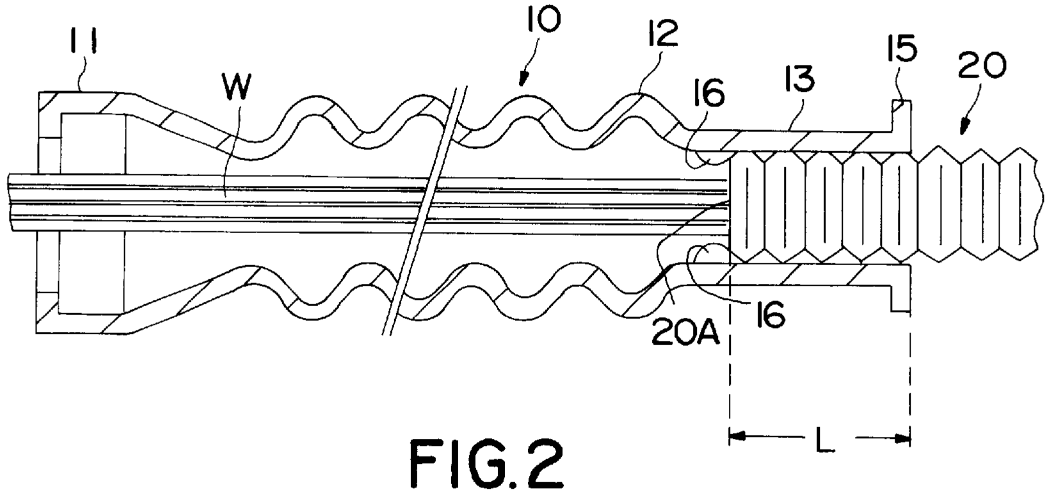
FIG. 2 is a partially enlarged section of the rubber boot and the corrugate tube according to the first embodiment.
Figure 3:
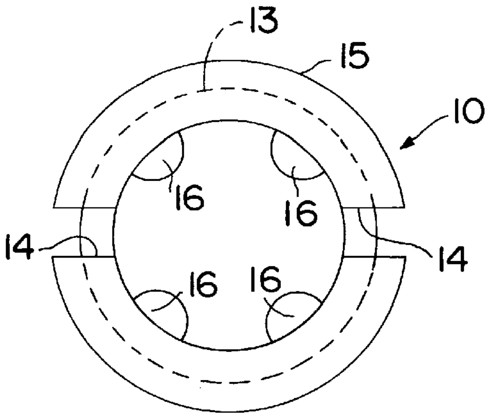
FIG. 3 is a rear view of the rubber boot showing the arrangement of projections according to the first embodiment.

Hereafter, a first embodiment of the invention is described with reference to FIGS. 1 to 3.

Terminals (not shown) secured to ends of a plurality of wires W are mounted in a connector C, and the wires W extend from the rear side of the connector C to form a wiring harness. A rubber boot (receiving side tubular member as an element of the invention) 10 and a corrugate tube 20 (inserting side tubular member as an element of the invention) are fitted or fittable on or inserted or insertable over this bundle of wires W so as to protect the terminals from deposition of waterdrops or like undesirable occurrence.

First, the corrugate tube 20 is described. The corrugate tube 20 has a bellows-like shape, and a cut or recess (not shown) is made over its entire length along its longitudinal direction. The corrugate tube 20 is cut to a specified length so as to conform to the length of the wires W to be arranged. The corrugate tube 20 is fitted around the wires W by opening the cut. The corrugate tube 20 is made e.g. of a resin material and is relatively hard to be deformed. Accordingly, the wires W contained in the corrugate tube 20 are arranged while being substantially held in a desired configuration. A leading end 20A of the corrugate tube 20 is connected with a fitting end portion 13 of the rubber boot 10 to be described later by being closely fitted or inserted into the fitting end portion 13.

The rubber boot 10 is such that a connector connection portion 11, a flexible portion 12 and the fitting end portion 13 are continuously formed in this order from its leading end and has, as a whole, such a tubular shape as to permit the insertion of the wires W.

The connector connection portion 11 is shaped such that its width substantially increases toward the leading end, and a preferably rectangular opening formed at the leading end thereof is fitted on the connector C to connect the rubber boot 10 with the connector C. The shape of the opening is adapted to the outer shape of the connector C. The flexible portion 12 has a bellows-like shape and is easily deformable. The deformability of the flexible portion 12 allows the wires W to be bent for the arrangement. The fitting end portion 13 has, as a whole, a tubular shape and is formed with two slits 14 extending from its rear end to its front end. Into the fitting end portion 13 is closely fitted the leading end 20A of the corrugate tube 20. The inner diameter of the fitting end portion 13 is substantially equal to the smallest inner diameter of the flexible portion 12. A jaw portion 15 is formed at a rear edge of the fitting end portion 13.

The rubber boot 10 is provided with a stopper means for restricting the fitting or insertion length L of the corrugate tube 20. The stopper means according to this embodiment is constructed by e.g. four projections 16 integrally or unitarily formed with the rubber boot 10. The respective projections 16 have a preferably rounded or semi-spherical shape; project inward in the front end positions (at a boundary with the flexible portion 12) of the inner surface of the fitting end portion 13 with respect to the longitudinal direction as shown in FIG. 2; and are circumferentially arranged, in particular at even intervals of substantially 90° as shown in FIG. 3.

Since the projections 16 do not extend over the entire circumference of the fitting end portion 13, surface areas smoothly continuous with the flexible portion 12 along the longitudinal direction are ensured at the inner surface of the fitting end portion 13 where the projections 16 are not formed.

Next, the action of this embodiment is described.

First, the wires W before the connection with the connector C are inserted into the rubber boot 10 from its rear side, i.e. from the fitting end portion 13 through the flexible portion 12 and the connector connection portion 11. At this time, even if the terminals connected at the leading ends of the wires W move in contact with the inner surface of the fitting end portion 13, they can pass through the smooth surface areas between the projections 16. Accordingly, the insertion of the wires W is not obstructed by the projections 16. After, the wires W inserted through the rubber boot 10 are connected with the connector C, the rubber boot 10 is fitted on the connector C. It should be appreciated that the rubber boot 10 may be fitted on the connector C after the corrugate tube 20 is connected with the rubber boot 10. Portions of the wires W extending rearward from the rubber boot 10 are covered by the corrugate tube 20.

Next, the corrugate tube 20 is connected with the rubber boot 10. During this connection, the leading end 20A of the corrugate tube 20 is fitted into the fitting end portion 13. However, no consideration is necessary as to whether or not the fitting length of the leading end 20A is excessively long. More specifically, as the corrugate tube 20 is inserted, the leading end 20A thereof comes into contact with the projections 16 before entering the flexible portion 12, with the result that the undesired entry of the leading end 20A into the flexible portion 12 can be prevented. In the case that the corrugate tube 20 is insufficiently fitted into the fitting end portion 13, the position of the leading edge of the corrugate tube 20 can be visually confirmed through the slits 14. Accordingly, there is no likelihood that the corrugate tube 20 is left insufficiently fitted.

After the corrugate tube 20 is inserted by the specified or predetermined or predeterminable length L, tape T is wound around the fitting end portion 13, thereby fastening the corrugate tube 20 to the fitting end portion 13 while narrowing the width of the slits 14. In this way, the connection of the corrugate tube 20 with the rubber boot 10 is completed. Alternatively or additionally to the tape T a clamp or clip (not shown) may be fitted or clamped on or around the fitting end portion 13. The clamp may be inserted into one or more recesses or openings (not shown) formed in the end fitting portion 13, in particular so as to be at least partially in contact with the corrugate tube 20. The tape T and/or the clamp thus form securing or fastening means.

Since the corrugate tube 20 is not located in the flexible portion 12 when the rubber boot 10 and the corrugate tube 20 are connected, there is no likelihood that the easy and smooth deformation of the flexible portion 12 is hindered by the difficulty of the corrugate tube 20 to be deformed when the wires W are arranged while being bent at a small radius of curvature in the vicinity of the connector C. Thus, the wires can easily bend for the arrangement.

As described above, since the insertion or fitting length L of the corrugate tube 20 into the fitting end portion 13 is restricted by the projections 16 during the connection of the rubber boot 10 and the corrugate tube 20, the entry of the corrugate tube 20 into the flexible portion 12 resulting from an excessive insertion thereof can be prevented, ensuring the smooth deformation of the flexible portion 12. Further, there is no need for a consideration as to the excessive insertion of the corrugate tube 20, which leads to an improved operability.

Further, since the stopper means is constructed by the projections 16 integrally or unitarily formed with the rubber boot 10, the rubber boot 10 can be produced with better efficiency and at a reduced cost as compared with the case where a separately formed stopper means is mounted on the rubber 10.

Furthermore, since the projections 16 are circumferentially spaced apart, the terminals in contact with the inner surface of the fitting end portion 13 can move to the flexible portion 12 without getting caught by the projections 16 during the insertion of the wires W into the rubber boot 10. In other words, the wires W can be easily and smoothly inserted through the rubber boot 10.

Figure 4:
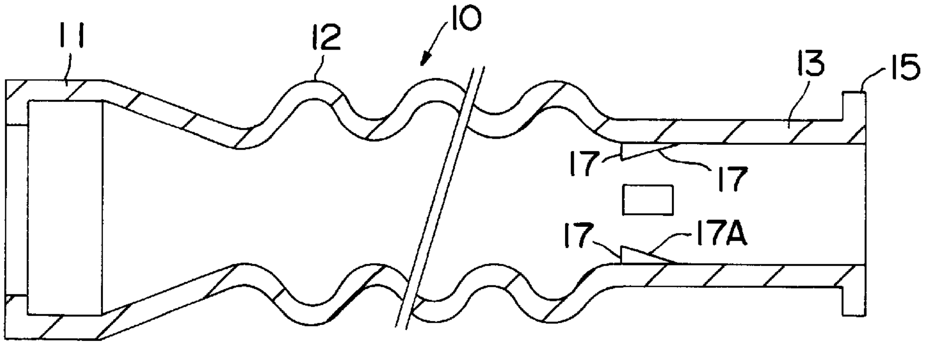
FIG. 4 is a section of a rubber boot according to a second embodiment.

Next, a second embodiment of the invention is described with reference to FIG. 4.

The second embodiment differs from the first embodiment in the shape of the projections. Since the other construction is same or similar as the first embodiment, no description is given on the construction, action and effect thereof by identifying it by the same reference numerals.

Each projection 17 in this embodiment has a right, substantially triangular cross section and is formed with a tapered or slanted or inclined guide surface 17A smoothly continuous with the inner surface of the fitting end portion 13. Accordingly, while wires (not shown in FIG. 4) are inserted into the rubber boot 10 through an opening at the rear end of the end fitting portion 13 from terminals connected therewith, even if the terminals move toward the projections 17 while sliding in contact with the inner surface of the fitting end portion 13, the terminals smoothly move along the guide surfaces 17A without getting caught and pass the projections 17 while being in sliding contact with the guide surfaces 17A. Therefore, the wires can be easily and smoothly inserted through the rubber boot 10.

Figure 5:
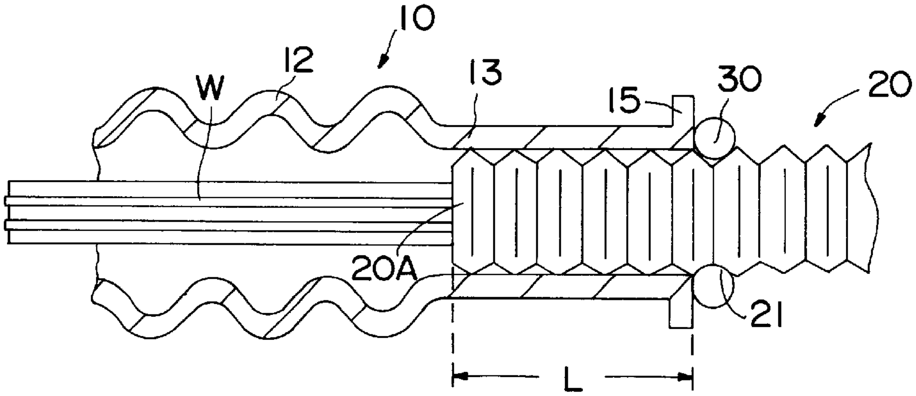
FIG. 5 is a section of a rubber boot and a corrugate tube according to a third embodiment in their connected state.
Figure 6:
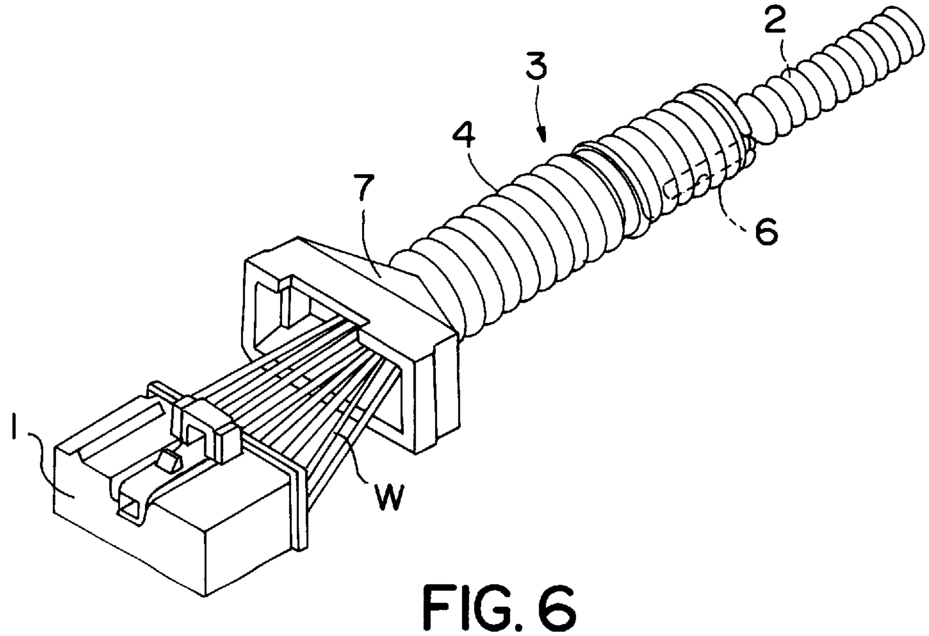
FIG. 6 PRIOR ART
FIG. 6 is a perspective view of a prior art.
Figure 7:
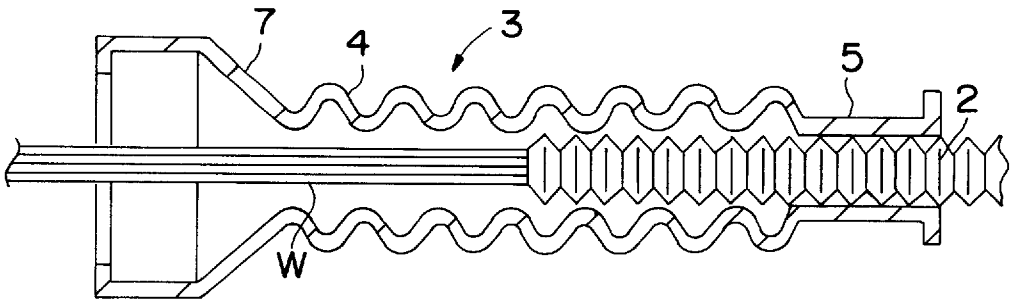
FIG. 7 PRIOR ART
FIG. 7 is a section of the prior art.

Next, a third embodiment of the invention is described with reference to FIG. 5.

The third embodiment differs from the first embodiment in the construction of the stopper means. Since the other construction is same or similar as the first embodiment, no description is given on the construction, action and effect thereof by identifying it by the same reference numerals.

The stopper means of this embodiment is constructed by a ring member (stopper means as an element of the present invention) 30 formed separately from the rubber boot 10 and the corrugate tube 20. The ring member 30 is fitted in a groove 21 of a bellows on the outer surface of the corrugate tube 20 and is secured by adhesive or the like so as not to come off. The groove 21 in which the ring member 30 is fitted is so determined that the length between the groove 21 and the leading edge of the corrugate tube 20 is substantially not longer than the length of the fitting end portion 13. The ring member 30 is set in position by being fitted to the leading edge of the corrugate tube 20 and slid along the longitudinal direction by contractively deforming the corrugate tube 20. By displacing or setting the ring 30 appropriately on the corrugate tube 20 the insertion or fitting length L of the corrugate tube into the fitting end portion 13 can be predetermined or appropriately set.

When such a corrugate tube 20 is fitted into the fitting end portion 13, the ring member 30 comes into contact with the jaw portion 15 at the rear end of the fitting end portion 13, preferably before the leading end 20A of the corrugate tube 20 enters the flexible portion 12, thereby hindering any further entry of the corrugate tube 20 into the fitting end portion 13. This prevents the entry of the corrugate tube 20 into the flexible portion 12 caused by an excessive insertion.

Further, in the case that the corrugate tube 20 is insufficiently fitted into the fitting end portion 13, the position of the ring member 30 away from the jaw portion 15 can be visually confirmed. Accordingly, there is no likelihood that the corrugate tube 20 is left insufficiently fitted.

The present invention is not limited to the described and illustrated embodiments. For example, the following embodiments are embraced by the technical scope of the present invention as defined in the claims. Besides the following embodiments, a variety of changes can be made without departing the spirit and scope of the present invention as defined in the claims.

(1) The projections in the first and second embodiments are not limited to the semi-spherical shape or triangular shape, but may take a conical shape or other shape.

(2) In the first and second embodiments, there may be provided 3 or less projections, or 5 or more projections.

(3) In the first and second embodiments, the projection may extend over the entire circumference.

(4) In the first and second embodiments, the projections may be formed separately from the rubber boot, and the preformed projections may be mounted on the preformed rubber boot.

(5) In the third embodiment, a member corresponding to the stopper ring may be integrally or unitarily formed with the corrugate tube.

(6) In the case that the stopper ring is integrally or unitarily formed with the corrugate tube in the third embodiment, it may be constructed by a plurality of ring segments provided in positions on one circumference instead of the ring member continuously extending over the entire circumference.

(7) Although the receiving and inserting side tubular members are the rubber boot and the corrugate tube used to protect the wires in the foregoing embodiments, the present invention is also applicable the receiving and inserting side tubular members used for the other purposes.

What is claimed is:

1. A connection construction for connecting an inserting side tubular member with a receiving side tubular member, said inserting side tubular member having at least a maximum outside diameter and a minimum outside diameter and having a wiring harness therein, said receiving side tubular member having a substantially deformable flexible portion, a fitting end portion continuous with the deformable flexible portion and extending therefrom, the fitting end portion defining an inside diameter substantially equal to the maximum outside diameter of the inserting side tubular member, a plurality of circumferentially spaced projections extending inwardly on said fitting end portion at locations substantially adjacent said deformable flexible portion, said projections each being formed with smoothly tapered surfaces defining a minimum inside diameter less than the minimum outside diameter of the inserting side tubular member for restricting the insertion of the inserting side tubular member into the receiving side tubular member to a predetermined insertion length, and whereby the circumferentially spaced projections with the smoothly tapered surfaces avoid impeding movement of the wiring harness from the inserting side tubular member into and through the receiving side tubular member.

2. A connection construction according to claim 1, wherein the projections are unitarily formed with the fitting end portion.

3. A connection construction according to claim 1, wherein the receiving side tubular member is provided with circumferentially spaced slits for allowing reduction at least partially of the circumference of the receiving side tubular member for securing the inserting side tubular member to the receiving side tubular member.

4. A connection construction according to claim 3, wherein the circumference of the receiving side tubular member is reduced by applying fastening means to the receiving side tubular member.

5. A connection construction according to claim 1, wherein each said projection is substantially rounded for defining the smoothly tapered surface.

6. A connection construction according to claim 1, wherein each said projection is substantially semi-spherical to define the smoothly tapered surface.

* * * * *